(12) United States Patent
Lin et al.

(10) Patent No.: US 12,179,230 B2
(45) Date of Patent: Dec. 31, 2024

(54) COATING DEVICE WITH MULTIPLE OVEN DRYING MECHANISMS

(71) Applicant: CONTEMPORARY AMPEREX TECHNOLOGY (HONG KONG) LIMITED, Hong Kong (CN)

(72) Inventors: Yinxiang Lin, Ningde (CN); Peng Jin, Ningde (CN); Chao Guo, Ningde (CN); Nengwu Liao, Ningde (CN); Xuefeng Kang, Ningde (CN); Lijun Li, Ningde (CN); Wengang Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/328,603

(22) Filed: Jun. 2, 2023

(65) Prior Publication Data
US 2023/0311155 A1    Oct. 5, 2023

Related U.S. Application Data

(63) Continuation of application No. PCT/CN2022/097952, filed on Jun. 9, 2022.

(30) Foreign Application Priority Data

Jul. 30, 2021   (CN) .......................... 202121776631.4

(51) Int. Cl.
*B05C 5/02*   (2006.01)
*B05C 9/04*   (2006.01)
(Continued)

(52) U.S. Cl.
CPC .................. *B05C 9/14* (2013.01); *B05C 9/04* (2013.01); *B05D 3/007* (2013.01); *B05D 3/0413* (2013.01);
(Continued)

(58) Field of Classification Search
None
See application file for complete search history.

(56) References Cited

U.S. PATENT DOCUMENTS

2003/0221332 A1* 12/2003 Maria de Vroome ...................... B41F 23/0483
62/62
2005/0025889 A1* 2/2005 Yago ..................... B05D 3/0413
427/314
(Continued)

FOREIGN PATENT DOCUMENTS

CN         1851958     * 10/2006
CN         1851958 A    10/2006
(Continued)

OTHER PUBLICATIONS

The World Intellectual Property Organization (WIPO) International Search Report for PCT/CN2022/097952 Sep. 15, 2022 8 pages (including English translation).

*Primary Examiner* — Binu Thomas
(74) *Attorney, Agent, or Firm* — ANOVA LAW GROUP, PLLC (57) ABSTRACT

A coating device includes a first coating mechanism configured to coat a first surface of a substrate, a first oven drying mechanism arranged downstream of the first coating mechanism, a second coating mechanism arranged downstream of the first oven drying mechanism and configured to coat a second surface of the substrate opposite to the first surface, and a second oven drying mechanism arranged downstream of the second coating mechanism. The coating device further includes a third oven drying mechanism arranged downstream of the second oven drying mechanism and configured to further oven dry the coating on the second surface such that the coating on the first surface and the coating on the second surface are evenly dried.

13 Claims, 3 Drawing Sheets

(51) Int. Cl.
  *B05C 9/14* (2006.01)
  *B05D 3/00* (2006.01)
  *B05D 3/04* (2006.01)
  *H01M 4/04* (2006.01)
  *B05D 3/02* (2006.01)
  *H01M 4/139* (2010.01)

(52) U.S. Cl.
  CPC .......... *B05C 5/0254* (2013.01); *B05D 3/0236* (2013.01); *B05D 2252/02* (2013.01); *B05D 2252/10* (2013.01); *H01M 4/04* (2013.01); *H01M 4/139* (2013.01)

(56) References Cited

U.S. PATENT DOCUMENTS

| | | | | |
|---|---|---|---|---|
| 2006/0121202 A1* | 6/2006 | Endo | ...................... | B05D 7/586 118/66 |
| 2007/0026156 A1* | 2/2007 | Mandai | .................. | G11B 5/842 118/66 |
| 2013/0149466 A1* | 6/2013 | Nakano | ............... | H01M 4/0404 427/58 |
| 2016/0263913 A1* | 9/2016 | Akatsu | .................. | B05C 1/0813 |
| 2019/0081317 A1* | 3/2019 | Keil | .......................... | B05C 9/14 |
| 2020/0261940 A1* | 8/2020 | Drobnick | ................ | B05C 19/06 |
| 2022/0045309 A1* | 2/2022 | Min | .......................... | B05C 9/14 |
| 2023/0110084 A1* | 4/2023 | Shin | .................... | B05C 11/1005 427/356 |

FOREIGN PATENT DOCUMENTS

| | | | | |
|---|---|---|---|---|
| CN | 2850718 | Y | 12/2006 | |
| CN | 102921602 | A | 2/2013 | |
| CN | 106000822 | A * | 10/2016 | .............. B05C 9/14 |
| CN | 106475277 | A | 3/2017 | |
| CN | 106733415 | A | 5/2017 | |
| CN | 206392351 | U | 8/2017 | |
| CN | 111295550 | A | 6/2020 | |
| CN | 215465733 | U | 1/2022 | |
| JP | 2003170101 | A | 6/2003 | |
| JP | 2021090958 | A | 6/2021 | |

* cited by examiner

COATING DEVICE WITH MULTIPLE OVEN DRYING MECHANISMS

CROSS REFERENCE TO RELATED APPLICATIONS

The present application is a continuation of International Application No. PCT/CN2022/097952, filed on Jun. 9, 2022, which claims priority to Chinese patent application No. 202121776631.4 filed on Jul. 30, 2021 and entitled "COATING DEVICE," which are incorporated herein by reference in their entirety.

TECHNICAL FIELD

The present application relates to the field of battery technologies, and in particular, to a coating device.

BACKGROUND ART

With the application and gradual popularization of lithium-ion batteries in the field of communications, portable electronic products, electric vehicles, aerospace, ships, and other fields, requirements for high range and safety performance of batteries are becoming increasingly strong, and higher requirements are also put forward for a coating process of lithium-ion power battery electrode sheets, especially in an oven drying process of electrode sheets, which directly affects the forming quality of electrode sheets.

Therefore, how to improve the oven drying quality of the electrode sheets has become an urgent problem in the battery field.

SUMMARY

Embodiments of the present application provide a coating device to alleviate the problem of poor oven drying quality of electrode sheets.

The embodiments of the present application provide a coating device for coating a substrate, and the substrate includes a first surface and a second surface opposite to each other. The coating device includes a first coating mechanism, a first oven drying mechanism, a second coating mechanism, a second oven drying mechanism, and a third oven drying mechanism. The first coating mechanism is configured to coat the first surface. The first oven drying mechanism is arranged downstream of the first coating mechanism, and the first oven drying mechanism is configured to oven dry a coating on the first surface. The second coating mechanism is arranged downstream of the first oven drying mechanism, and the second coating mechanism is configured to coat the second surface. The second oven drying mechanism is arranged downstream of the second coating mechanism, and the second oven drying mechanism is configured to oven dry a coating on the second surface. The third oven drying mechanism is arranged downstream of the second oven drying mechanism, and the third oven drying mechanism is configured to oven dry the coating on the second surface.

In the above technical solution, the coating of the first surface and the coating of the second surface of the substrate are oven dried by their respective first oven drying mechanism and second oven drying mechanism. The coating of the first surface is oven dried first, and then the coating of the second surface is oven dried. When the coating of the second surface is oven dried, the coating of the first surface will be oven dried again, that is, the coating of the first surface is oven dried twice, so that drying degrees of the coating of the first surface and the coating of the second surface are different, resulting in uneven oven drying. The third oven drying mechanism is arranged downstream of the second oven drying mechanism, and is capable of oven drying the coating of the second surface for the second time so that the drying degrees of the coating of the first surface and the coating of the second surface are consistent, thereby reducing a drying difference between the coating of the first surface and the coating of the second surface, and improving the uniformity of oven drying of the coating on the substrate.

In some embodiments of the present application, the third oven drying mechanism includes a heating assembly and a plurality of driving rollers, the plurality of driving rollers is used for transferring the substrate, and the substrate forms a transferring section between two adjacent driving rollers. The heating assembly is arranged between two adjacent and opposite transferring sections and faces the second surface.

In the above technical solution, the plurality of driving rollers is capable of extending a transferring path of the substrate, and extending an oven drying time of the third oven drying mechanism to the substrate. The heating assembly is arranged facing a second surface of a transferring section between two adjacent driving rollers, so that heat of the heating assembly is mainly used for oven drying the coating of the second surface of the substrate, thereby reducing an impact to the coating of the first surface.

In some embodiments of the present application, the third oven drying mechanism further includes a box body, and the heating assembly and the plurality of driving rollers is arranged in the box body. The box body is further provided with an air inlet portion for a fluid medium to enter the box body and a return air portion for the fluid medium to be discharged from the box body. The third oven drying mechanism further includes a cycling unit, and the cycling unit is configured to guide the fluid medium discharged from the return air portion into the box body from the air inlet portion.

In the above technical solution, the fluid medium discharged from the return air portion carries the heat in the box body, and the cycling unit is capable of guiding the fluid medium discharged from the return air portion into the box body from the air inlet portion, so that the heat in the box body is capable of being fully utilized to reduce energy consumption.

In some embodiments of the present application, the box body is further provided with an inlet for the substrate to penetrate into the box body and an outlet for the substrate to penetrate out of the box body. The coating device further includes an import roller and an export roller. The import roller is arranged at the inlet. The import roller is configured to import the substrate from the inlet to the box body. The export roller is arranged at the outlet. The export roller is configured to export the substrate out of the box body from the outlet.

In the above technical solution, the arrangement of the import roller and the export roller is capable of causing the substrate to enter the box body smoothly and move out of the box body smoothly, so as to prevent the substrate from being damaged due to scratching and damaging of the substrate when entering the box body and moving out of the box body.

In some embodiments of the present application, at least one of the import roller or the export roller is arranged in the box body.

In the above technical solution, the substrate is most likely to have unstable transferring when entering the box body and penetrating out of the box body. Therefore, at least one of the import roller or the export roller is arranged in the box body, which is capable of improving the stability of substrate transferring when the substrate penetrates into the box body and penetrates out of the box body.

In some embodiments of the present application, the coating device further includes a filter assembly, the filter assembly is arranged at the air inlet portion, and the filter assembly is configured to filter the fluid medium entering the box body from the air inlet portion.

In the above technical solution, the filter assembly is capable of filtering the fluid medium entering the box body from the air inlet portion, so that the fluid medium entering the box body is clean enough, thereby improving the safety and oven drying quality of the oven drying process.

In some embodiments of the present application, the coating device further includes a preheating assembly, the preheating assembly is arranged at the air inlet portion, and the preheating assembly is configured to preheat the fluid medium entering the box body from the air inlet portion.

In the above technical solution, the preheating assembly is arranged at the air inlet portion, and the preheating assembly is configured to preheat the fluid medium entering the box body from the air inlet portion to avoid an excessively low temperature of the fluid medium entering the box body from the air inlet portion, thus reducing a temperature in the box body and affecting the oven drying of the third oven drying mechanism for the coating of the second surface of the substrate.

In some embodiments of the present application, the coating device further includes an air blowing portion, the air blowing portion is arranged downstream of the third oven drying mechanism, and the air blowing portion is configured to provide the fluid medium to the substrate to adjust a temperature of the substrate.

In the above technical solution, the air blowing portion is capable of providing the fluid medium to the substrate to adjust the temperature of the substrate, for example, the air blowing portion provides cold air to the substrate, and is capable of cooling the substrate after oven drying, so that the substrate is cooled quickly, and the substrate is capable of performing a next process, thereby improving the production efficiency. In addition, performing cooling after the oven drying is further capable of reducing the risk of wrinkling in a substrate transferring process, so that the substrate transferring is stable, and the stability of acceleration of the substrate transferring speed is ensured.

In some embodiments of the present application, the coating device further includes a cooling box, the cooling box is arranged downstream of the third oven drying mechanism, and the air blowing portion is arranged in the cooling box. The cooling box is provided with a plurality of traction rollers, and the plurality of traction rollers are configured for the substrate to wind in turn along a moving direction thereof.

In the above technical solution, the air blowing portion is arranged in the cooling box, and the air blowing portion is capable of providing the fluid medium to the cooling box, so as to adjust the temperature of the substrate in the cooling box, and narrow a diffusion range of the fluid medium to be able to quickly adjust the temperature of the substrate. The cooling box is provided with a plurality of traction rollers, which are capable of extending a moving path of the substrate in the box body, thereby extending a temperature adjustment time, and ensuring that the temperature of the substrate is adjusted to a required range.

In some embodiments of the present application, the coating device further includes a tension adjusting mechanism, the tension adjusting mechanism is arranged in the cooling box, and the tension adjusting mechanism is configured to adjust a tension of the substrate.

In the above technical solution, the tension adjusting mechanism is configured to adjust the tension of the substrate to balance the tension of the substrate and ensure smooth transferring of the substrate.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Reference numerals: 1000—Coating device; 100—First coating mechanism; 200—First oven drying mechanism; 20—Oven drying chamber; 201—First oven drying side; 202—Second oven drying side; 21—Oven drying assembly; 22—First air supplying portion; 23—Air extraction portion; 24—First wind box; 241—First wall; 242—First air inlet chamber; 243—First box wall; 244—First air supplying port; 25—First drive unit; 26—Outer box; 262—First penetrating inlet; 263—First penetrating outlet; 264—First air exhaust outlet; 27—Second air supplying portion; 28—Second wind box; 281—Second wall; 282—Second air inlet chamber; 283—Second box wall; 284—Second air supplying port; 29—Second drive unit; 30—Return air chamber; 32—First air exhaust unit; 300—Second coating mechanism; 400—Second oven drying mechanism; 500—Third oven drying mechanism; 50—Heating assembly; 501—Heating portion; 51—Driving roller; 511—First driving roller; 512—Second driving roller; 52—Box body; 521—Air inlet portion; 522—Return air portion; 523—Inlet; 524—Outlet; 525—Air exhaust outlet; 53—Cycling unit; 54—Fresh air outlet; 55—Air exhaust unit; 600—Unwinding mechanism; 700—First pass roller assembly; 800—Unwinding correction mechanism; 900—First outlet correction mechanism; 1100—Second outlet correction mechanism; 1200—First traction mechanism; 1300—Second traction mechanism; 1400—First surface density measuring mechanism; 1500—Second surface density measuring mechanism; 1600—Head correction mechanism; 1700—Climbing mechanism; 1800—Cooling traction mechanism; 1810—Air blowing portion; 1820—Cooling box; 1830—Traction roller; 1840—Tension adjusting mechanism; 1850—Tension sensor; 1860—Tension partition mechanism; 1861—Press roller; 1862—Press roller drive unit; 1900—Winding mechanism; 2000—Winding correction mechanism; 2100—Import roller; 2200—Export roller; 2300—Filtering assembly; 2400—Preheating assembly; 3000—Substrate; 3100—Transferring section; A—First direction; B—Second direction; and C—Third direction.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the embodiments of the present application rather than all the embodiments. The assembly of the embodiments of the present application generally described and illustrated in the drawings herein can be arranged and designed in a variety of different configurations.

Therefore, the following detailed description of the embodiments of the present application provided in the accompanying drawings is not intended to limit the scope of the present application claimed for protection, but merely represents selected embodiments of the present application. Based on the embodiments in the present application, all other embodiments obtained by those of ordinary skill in the art without creative effort fall within the protection scope of the present application.

It should be noted that in case of no conflicts, the embodiments and features of the embodiments in the present application may be combined with each other.

It should be noted that like reference numerals and letters denote similar items in the following figures, and therefore, once an item is defined in one figure, it does not require further definition and explanation in subsequent figures.

In the description of the embodiments of the present application, it should be noted that an indicated orientation or position relationship is based on an orientation or position relationship shown in the accompanying drawings, or an orientation or position relationship that is usually placed when a product of the present application is used, or an orientation or position relationship that is commonly understood by those skilled in the art, only for the convenience of describing the present application and simplifying the description, rather than indicating or implying that the apparatus or element referred to must have a particular orientation or be constructed and operated in a particular orientation, and therefore will not be interpreted as limiting the present application. In addition, the terms "first," "second," "third," and the like are used for differentiated description only, and cannot be construed as indicating or implying relative importance.

"A plurality of" in the present application refers to two or more (including two).

An electrode sheet mentioned in the embodiments of the present application includes a current collector and an active material layer coated on a surface of the current collector. The active material layer is coated on a partial region of the current collector. A current collector not coated with the active material layer protrudes from a current collector coated with the active material layer. The current collector not coated with the active material layer serves as a tab of the electrode sheet. The electrode sheet may be a positive electrode sheet or a negative electrode sheet. If the electrode sheet is a positive electrode sheet, the positive electrode sheet includes a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive tab. Taking a lithium-ion battery as an example, the material of the positive electrode current collector may be aluminum, and the positive active material may be lithium cobalt oxide, lithium iron phosphate, ternary lithium, lithium manganate, and the like. If the electrode sheet is a negative electrode sheet, the negative electrode sheet includes a negative electrode current collector and a negative electrode active material layer, wherein the negative electrode active material layer is coated on a surface of the negative electrode current collector, the part of the negative electrode current collector not coated with the negative electrode active material layer protrudes from the part of the negative electrode current collector already coated with the negative electrode active material layer, and the part of the negative electrode current collector not coated with the negative electrode active material layer serves as a negative tab. The material of the negative electrode current collector may be copper, and the negative electrode active material may be carbon, silicon, and the like.

Various factors need to be considered in the manufacturing of the electrode sheet to ensure the forming quality of the electrode sheet, such as a coating weight, a coating density, a coating thickness, and a transportation accuracy. In addition, the oven drying quality of the active material layer of the electrode sheet needs to be considered.

The main factors affecting the oven drying quality of the active material layer of the electrode sheet include the heating uniformity, insufficient heating, and excessive heating.

Generally, a first surface and a second surface of a current collector of the electrode sheet that are opposite to each other are both coated with an active material layer. The first surface is first coated with the active material layer by a first coating mechanism, and the active material layer of the first surface is oven dried by a first oven drying mechanism downstream of the first coating mechanism. The second surface of the current collector is coated with the active material layer by a second coating mechanism downstream of the first oven drying mechanism, and the active material layer of the second surface is oven dried by a second oven drying mechanism downstream of the second coating mechanism. The inventor found that because the active material layer of the first surface and the active material layer of the second surface are oven dried by their respective oven drying mechanisms, the active material layer of the first surface is oven dried first, and then the active material layer of the second surface is oven dried. When the active material layer of the second surface is oven dried, the active material of the first surface can be oven dried again, that is, the active material layer of the first surface is oven dried twice, so that drying degrees of the active material layer of the first surface and the active material layer of the second surface are different, resulting in uneven drying of the electrode sheet.

Based on this, the embodiments of the present application provide a technical solution. By arranging a third oven drying mechanism downstream of the second oven drying mechanism, the third oven drying mechanism is configured to oven dry the coating of the second surface, so that the active material layer of the first surface and the active material layer of the second surface are oven dried twice, the drying degrees of the active material layer of the first surface and the active material layer of the second surface are consistent, thereby reducing a drying difference between the active material layer of the first surface and the active material layer of the second surface, and improving drying uniformity of the active material layer of the electrode sheet.

The technical solution described in the embodiments of the present application is applicable to a coating device and other products requiring the use of the oven drying technology or heating technology.

Figure 1:
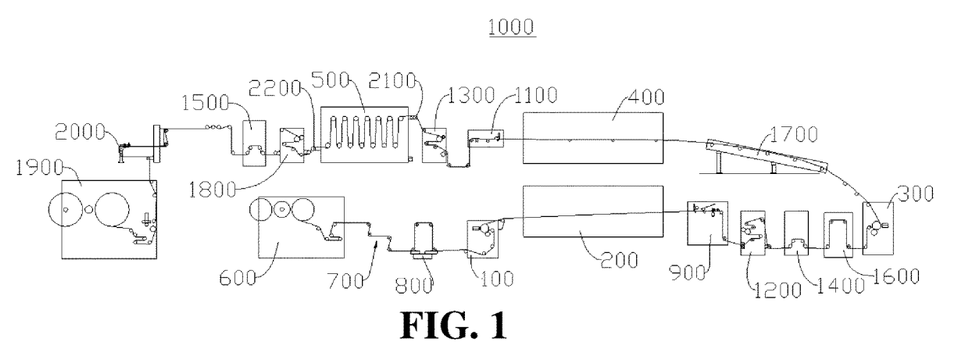
FIG. 1 is a schematic structural diagram of a coating device according to some embodiments of the present application.

As shown in FIG. 1, some embodiments of the present application provide a coating device 1000 for coating a substrate 3000, and the substrate 3000 includes a first surface and a second surface opposite to each other. The coating device includes a first coating mechanism 100, a first oven drying mechanism 200, a second coating mechanism 300, a second oven drying mechanism 400, and a third oven drying mechanism 500. The first coating mechanism 100 is configured to coat the first surface. The first oven drying mechanism 200 is arranged downstream of the first coating mechanism 100, and the first coating mechanism 100 is configured to oven dry a coating on the first surface. The second coating mechanism 300 is arranged downstream of the first oven drying mechanism 200, and the second coating mechanism 300 is configured to coat the second surface. The second oven drying mechanism 400 is arranged downstream of the second coating mechanism 300, and the second oven drying mechanism 400 is configured to oven dry a coating on the second surface. The third oven drying mechanism 500 is arranged downstream of the second oven drying mechanism 400, and the third oven drying mechanism 500 is configured to oven dry the coating on the second surface.

In the embodiments of the present application, a relevant structure is introduced by taking the coating device 1000 for coating and forming an electrode sheet as an example. Therefore, the substrate 3000 may be a current collector, and the coatings formed by coating the first surface and the second surface of the substrate 3000 using the first coating mechanism 100 and the second coating mechanism 300 may be active material layers. Depending on the polarity of the electrode sheet, the material of the current collector and the material of the active material layer are different. If the coating device 1000 forms a positive electrode sheet, the material of the current collector may be aluminum, and the active material may be lithium cobalt oxide, lithium iron phosphate, ternary lithium, lithium manganate, and the like. If the coating device 1000 forms a negative electrode sheet, the material of the current collector may be copper, and the active material may be carbon, silicon, and the like.

The "upstream" and "downstream" mentioned above and below in the embodiments of the present application refer to the order of production sequence, the upstream refers to the production sequence first, and the downstream refers to the production sequence later, not limiting the spatial position between components.

The coating of the first surface and the coating of the second surface of the substrate 3000 are oven dried by their respective first oven drying mechanism 200 and second oven drying mechanism 400. The coating of the first surface is oven dried first, and then the coating of the second surface is oven dried. When the coating of the second surface is oven dried, the coating of the first surface will be oven dried again, that is, the coating of the first surface is oven dried twice, so that drying degrees of the coating of the first surface and the coating of the second surface are different, resulting in uneven oven drying. The third oven drying mechanism 500 is arranged downstream of the second oven drying mechanism 400, and is capable of oven drying the coating of the second surface for the second time so that the drying degrees of the coating of the first surface and the coating of the second surface are consistent, thereby reducing a drying difference between the coating of the first surface and the coating of the second surface, and improving the uniformity of oven drying of the coating on the substrate 3000.

Still referring to FIG. 1, in some embodiments, the coating device 1000 further includes an unwinding mechanism 600, the unwinding mechanism 600 is arranged upstream of the first coating mechanism 100, and the unwinding mechanism 600 is configured for automatic unwinding and transportation of the substrate 3000.

In some embodiments, the coating device 1000 further includes a first pass roller assembly 700, and the first pass roller assembly 700 is arranged downstream of the unwinding mechanism 600 and upstream of the first coating mechanism 100. The first pass roller assembly 700 includes a plurality of first pass rollers arranged rotationally. The substrate 3000 is sequentially wound around the plurality of first pass rollers. The first pass roller assembly 700 is configured to support the substrate 3000 and realize transmission of the substrate 3000.

Due to existence of a manufacturing error and a mounting error of the device, the position of the substrate 3000 may be offset along a transportation direction of the substrate 3000, causing relative positions of the substrate 3000 and the coating mechanism to be offset, resulting in insufficient coating accuracy of the coating mechanism on the substrate 3000.

In some embodiments, the coating device 1000 further includes an unwinding correction mechanism 800, and the unwinding correction mechanism 800 is located downstream of the unwinding mechanism 600 and upstream of the first coating mechanism 100. The unwinding correction mechanism 800 is capable of receiving the substrate 3000 and adjusting the position of the substrate 3000 so that the substrate 3000 is capable of always being within a coating range of the first coating mechanism 100, so as to ensure the coating accuracy of the first coating mechanism 100 for the first surface of the substrate 3000.

Due to the existence of a manufacturing error and a mounting error of the device, the position of the substrate 3000 may offset during the oven drying of the first surface and the second surface of the substrate 3000, and the substrate 3000 may wrinkle, resulting in a direction offset of the relative positions of the substrate 3000 and other mechanisms.

Based on this, in some embodiments, the coating device 1000 further includes a first outlet correction mechanism 900, and the first outlet correction mechanism 900 is located downstream of the first oven drying mechanism 200 and arranged upstream of the second coating mechanism 300. The first outlet correction mechanism 900 is capable of receiving the substrate 3000 with the coating of the first surface being oven dried and adjusting the position of the substrate 3000, so that the substrate 3000 is capable of always being within the coating range of the second coating mechanism 300, so as to ensure the coating accuracy of the second coating mechanism 300 for the second surface of the substrate 3000. The first outlet correction mechanism 900 is further capable of flattening and removing the wrinkle of the coated substrate 3000 with the first surface coated with the coating, so as to maintain the flatness of the coated substrate 3000.

In some embodiments, the coating device 1000 further includes a second outlet correction mechanism 1100, and the second outlet correction mechanism 1100 is arranged downstream of the second oven drying mechanism 400. The second outlet correction mechanism 1100 is capable of receiving the substrate 3000 with the coating of the second surface being oven dried and adjusting the position of the substrate 3000. The second outlet correction mechanism 1100 is further capable of flattening and removing the wrinkle of the coated substrate 3000 with the first surface and the second surface coated with the coatings, so as to maintain the flatness of the coated substrate 3000.

There are many processes for electrode sheet forming, and a transmission path of substrate 3000 is long. On the transmission path of substrate 3000, the tension of the substrate 3000 may be uneven.

In some embodiments, the coating device 1000 further includes a first traction mechanism 1200, and the first traction mechanism 1200 is arranged downstream of the first outlet correction mechanism 900 and located upstream of the second coating mechanism 300. The first traction mechanism 1200 is configured to draw the substrate 3000 from the first outlet correction mechanism 900 to the second coating mechanism 300, and the first traction mechanism 1200 is further configured to form a tension partition between the first outlet correction mechanism 900 and the second coating mechanism 300, thereby ensuring that the tension of the substrate 3000 is balanced during transferring.

In some embodiments, the coating device 1000 further includes a second traction mechanism 1300, and the second traction mechanism 1300 is arranged downstream of the second outlet correction mechanism 1100. The second traction mechanism 1300 is configured to draw the substrate 3000 from the second outlet correction mechanism 1100 to the next station, and the second traction mechanism 1300 is further configured to form a tension partition between the second outlet correction mechanism 1100 and the next station to ensure the tension balance during the transferring of the substrate 3000.

In some embodiments, the third oven drying mechanism 500 is arranged downstream of the second traction mechanism 1300, and the second traction mechanism 1300 is configured to draw the substrate 3000 from the second outlet correction mechanism 1100 to the third oven drying mechanism 500, so that the third oven drying mechanism 500 oven dries the coating of the second surface for the second time.

In order to ensure the coating quality, in some embodiments, the coating device 1000 further includes a first surface density measuring mechanism 1400, and the first surface density measuring mechanism 1400 is arranged downstream of the first coating mechanism 100 and located upstream of the second coating mechanism 300. The first surface density measuring mechanism 1400 is configured to realize real-time monitoring of a surface density of the coating of the first surface, and may be in communication connection with the first coating mechanism 100 to realize closed-loop control of the coating weight.

The first surface density measuring mechanism 1400 may be arranged downstream of the first oven drying mechanism 200, and configured to detect the surface density of the coating of the first surface after oven drying. The first surface density measuring mechanism 1400 may also be arranged downstream of the first coating mechanism 100 and arranged upstream of the first oven drying mechanism 200, and configured to detect the surface density of the coating of the first surface before oven drying.

In some embodiments, the coating device 1000 further includes a second surface density measuring mechanism 1500, and the second surface density measuring mechanism 1500 is arranged downstream of the second coating mechanism 300. The second surface density measuring mechanism 1500 is configured to realize real-time monitoring of the surface density of the coating of the second surface, and may be in communication connection with the second coating mechanism 300 to realize closed-loop control of the coating weight.

The second density measuring mechanism may be arranged downstream of the second coating mechanism 300 and located upstream of the second oven drying mechanism 400, so that the second surface density measuring mechanism 1500 is configured to detect the surface density of the coating of the second surface before oven drying. The second surface density measuring mechanism 1500 may also be arranged downstream of the second oven drying mechanism 400, so that the second surface density measuring mechanism 1500 is configured to detect the surface density of the second surface coating after oven drying.

In some embodiments, the coating device 1000 further includes a head correction mechanism 1600. The head correction between mechanism is arranged downstream of the first surface density measuring mechanism 1400 and arranged upstream of the second coating mechanism 300. The head correction mechanism 1600 is configured to adjust the position of the substrate 3000 before the second coating mechanism 300 coated the second surface of the substrate 3000, and at the same time, can work with a Charge-coupled Device (CCD) measurement system to realize closed-loop control of position adjustment of the substrate 3000.

The coating device 1000 occupies a large area due to many processes of electrode sheet forming and the long substrate 3000. In order to avoid arrangement of various apparatuses of the coating device 1000 in a certain direction, in some embodiments, the coating device 1000 is arranged in two rows in parallel. As shown in FIG. 1, the mechanism upstream of the second coating mechanism 300 is arranged in the lower row, and the mechanism downstream of the second coating mechanism 300 is arranged in the upper row. In order to ensure that the substrate 3000 is capable of being smoothly transferred from the lower row to the upper row, the coating device 1000 further includes a climbing mechanism 1700, and the climbing mechanism 1700 is located downstream of the second coating mechanism 300 and arranged upstream of the second oven drying mechanism 400. The climbing mechanism 1700 is configured to support the substrate 3000 and draw the substrate 3000 from the second coating mechanism 300 to the second oven drying mechanism 400, so that the substrate 3000 is capable of being smoothly transferred from the second coating mechanism 300 to the second oven drying mechanism 400.

In some embodiments, the coating device 1000 further includes a cooling traction mechanism 1800, and the cooling traction mechanism 1800 is located downstream of the third oven drying mechanism 500, and performs traction transferring and cooling of the substrate 3000 after oven drying by the third oven drying mechanism 500, so as to ensure that the substrate 3000 coated with the coating does not wrinkle during transferring.

In some embodiments, when the second surface density measuring mechanism 1500 is located downstream of the second oven drying mechanism 400 and located upstream of the third oven drying mechanism 500, the coating device 1000 further includes a third surface density measuring mechanism (not shown in the figure), and the third surface density measuring mechanism is arranged downstream of the third oven drying mechanism 500. The third surface density measuring mechanism is configured to realize real-time monitoring of the surface density of the coating of the second surface after the second oven drying, and may be in communication connection with the second coating mechanism 300 to realize the closed-loop control of the coating weight.

Referring to FIG. 1, in some embodiments, the coating device 1000 further may not include the third surface density measuring mechanism, and the second surface density measuring mechanism 1500 is arranged downstream of the third oven drying mechanism 500. The second surface density measuring mechanism 1500 is configured to realize real-time monitoring of the surface density of the coating of the second surface after the second oven drying, and may be in communication connection with the second coating mechanism 300 to realize closed-loop control of the coating weight.

In some embodiments, the coating device 1000 further includes a winding mechanism 1900, and the winding mechanism 1900 is located downstream of the second surface density measuring mechanism 1500. The winding mechanism 1900 is configured for automatic winding and automatic roll changing of the substrate 3000 with both the first surface and the second surface coated with coatings.

In some embodiments, the coating device 1000 further includes a winding correction mechanism 2000, and the winding correction mechanism 2000 is arranged downstream of the second surface density measuring mechanism 1500. The winding correction mechanism 2000 is configured to adjust the position of the substrate 3000 before the winding mechanism 1900 rolls the substrate 3000.

Figure 2:
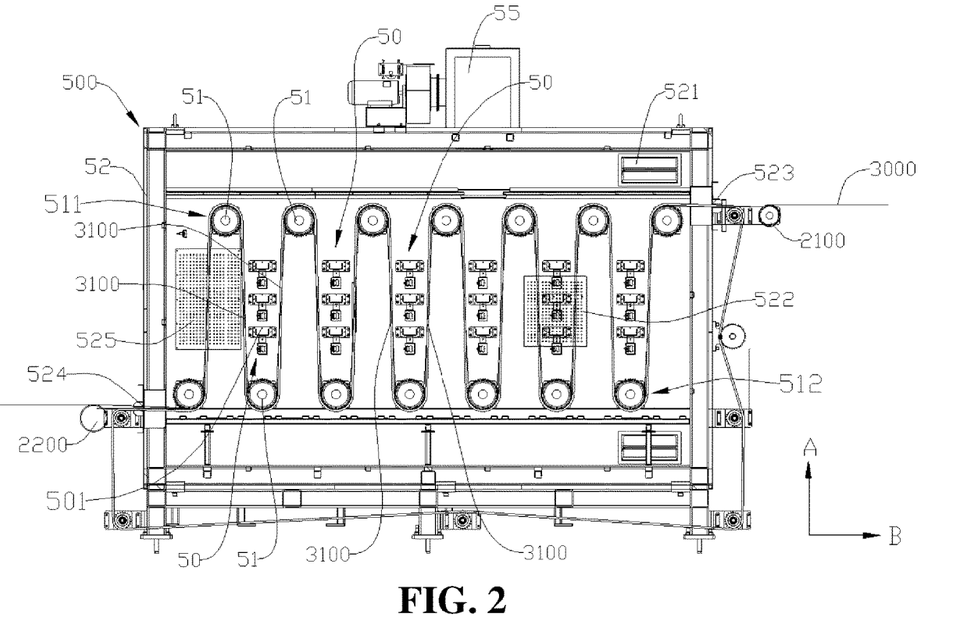
FIG. 2 is a schematic structural diagram of a third oven drying mechanism according to some embodiments of the present application from a first angle of view.

As shown in FIG. 2, in some embodiments, the third oven drying mechanism 500 includes a heating assembly 50 and a plurality of driving rollers 51, the plurality of driving rollers 51 are used for transferring the substrate 3000, and the substrate 3000 forms a transferring section 3100 between two adjacent driving rollers 51. The heating assembly 50 is arranged between two adjacent and opposite transferring sections 3100 and faces the second surface.

The plurality of driving rollers 51 are capable of extending a transferring path of the substrate 3000, and extending an oven drying time of the third oven drying mechanism 500 to the substrate 3000. The heating assembly 50 is arranged facing a second surface of a transferring section 3100 between two adjacent driving rollers 51, so that heat of the heating assembly 50 is mainly used for oven drying the coating of the second surface of the substrate 3000, thereby reducing an impact to the coating of the first surface.

In some embodiments, part of the plurality of driving rollers 51 is a first driving roller 511, and the other part of the plurality of driving rollers 51 is a second driving roller 512. There is a plurality of first driving rollers 511, and there is a plurality of second driving roller 512. The plurality of first driving rollers 511 and the plurality of second driving rollers are arranged at intervals in a first direction A, the plurality of first driving rollers 511 are arranged in rows in a second direction B, the plurality of second driving rollers 512 are arranged in rows in the second direction B, and the first direction A is perpendicular to the second direction B. The substrate 3000 winds the first driving rollers 511 and the second driving rollers 512 in turn in a transferring direction thereof, and the substrate 3000 forms a transferring section 3100 between a first driving roller 511 and a second driving roller 512 adjacent to each other. In this way, in the second direction B, the substrate 3000 is divided into a plurality of transferring sections 3100 arranged at intervals, and at least one heating assembly 50 is arranged between two adjacent transferring sections 3100, so that the heating assembly 50 is capable of simultaneously heating coatings of second surfaces of the two adjacent transmission sections, thereby being capable of improving the heating efficiency.

In some embodiments, the third oven drying mechanism 500 includes a plurality of heating assemblies 50, and the plurality of heating assemblies 50 are arranged in the box body 52 at intervals in the transferring direction of the substrate 3000, thereby being capable of improving the oven drying quality and oven drying efficiency.

Each heating assembly 50 includes a plurality of heating portions 501 arranged at intervals, so that the heating assembly 50 is capable of covering a large range, and a coverage of the heating assembly 50 in a length direction of the transferring section 3100 is basically consistent with the length of the transferring section 3100. The heating portion 501 may be a heating resistance wire, an infrared lamp tube, and the like.

Of course, the third oven drying mechanism 500 may also include only one heating assembly 50.

In some embodiments, the heating power of the third oven drying mechanism 500 may be less than the heating power of the first oven drying mechanism 200 and the heating power of the second oven drying mechanism 400 to reduce the influence of the heat of the third oven drying mechanism 500 on the coating of the first surface when the coating of the second surface is oven dried by the third oven drying mechanism 500. The heating power of the first oven drying mechanism 200 and the heating power of the second oven drying mechanism 400 may be the same or different. The first oven drying mechanism 200 and the second oven drying mechanism 400 with corresponding power may be selected according to the thickness of the coating of the first surface and the coating of the second surface, oven drying degree requirements, and the like.

In some embodiments, the third oven drying mechanism 500 may not be provided with a driving roller 51, that is, the heating assembly is arranged facing the second surface.

In some embodiments, the third oven drying mechanism 500 further includes a box body 52, and the heating assembly 50 and the plurality of driving rollers 51 are arranged in the box body 52. The box body 52 is further provided with an air inlet portion 521 for a fluid medium to enter the box body 52 and a return air portion 522 for the fluid medium to be discharged from the box body 52. The third oven drying mechanism 500 further includes a cycling unit 53, and the cycling unit 53 is configured to guide the fluid medium discharged from the return air portion 522 from the air inlet portion 521 to the box body 52. The fluid medium discharged from the return air portion 522 carries heat in the box body 52. The cycling unit 53 is capable of guiding the fluid medium discharged from the return air portion 522 from the air inlet portion 521 into the box body 52, so that the heat in the box body 52 is capable of being fully utilized to reduce energy consumption. In addition, oven drying the coating of the second surface of the substrate 3000 in the box body 52 is capable of reducing the heat loss of the heating assembly 50 and making full use of the heat of the heating assembly 50.

In the embodiment of the present application, the fluid medium is gas, such as external air and protective gas.

In some embodiments, the box body 52 is further provided with an inlet 523 for the substrate 3000 to penetrate into the box body 52 and an outlet 524 for the substrate 3000 to penetrate out of the box body 52. The coating device 1000 further includes an import roller 2100 and an export roller 2200. The import roller is arranged at the inlet 523. The import roller 2100 is configured to import the substrate 3000 from the inlet 523 to the box body 52. The export roller 2200 is arranged at the outlet 524. The export roller 2200 is configured to export the substrate 3000 out of the box body 52 from the outlet 524.

The import roller 2100 is capable of enabling the substrate 3000 to be stably and smoothly transferred from the last station (such as the second traction mechanism 1300) of the third oven drying mechanism 500 to the third oven drying mechanism 500. The export roller 2200 is capable of enabling the substrate 3000 to be stably and smoothly transferred from the third oven drying mechanism 500 to the next station (such as the cooling traction mechanism 1800) of the third oven drying mechanism 500. Therefore, the arrangement of the export roller 2200 and the import roller 2100 is capable of enabling the substrate 3000 to stably and smoothly enter the box body 52 and stably and smoothly move out of the box body 52, thereby reducing the risk of a damage to the substrate 3000 due to scratch when the substrate 3000 enters the box body 52 and moves out of the box body 52.

The transferring instability of the substrate 3000 is most likely to occur in the processes of the substrate 3000 entering the box body 52 and penetrating out of the box body 52. Therefore, in some embodiments, at least one of the import roller 2100 or the export roller 2200 is arranged in the box body 52 to improve the transferring stability of the substrate 3000 when entering the box body 52 and penetrating out of the box body 52.

In some embodiments, the import roller 2100 and the export roller 2200 are both arranged on an outer wall of the box body 52 to enable the substrate 3000 to enter the box body 52 and move out of the box body 52 smoothly, thereby reducing the risk of damaging the substrate 3000 due to scratch when the substrate 3000 enters the box body 52 and moves out of the box body 52. As shown in FIG. 1 and FIG. 2, the inlet 523 of the box body 52 is higher than the outlet 524, the inlet 523 of the box body 52 corresponding to the import roller 2100 is arranged on the outer wall of the box body 52, the outlet 524 of the box body 52 corresponding to the export roller 2200 is arranged on the outer wall of the box body 52, and the position of the import roller 2100 is higher than the position of the export roller 2200.

The import roller 2100 and the export roller 2200 are rotationally mounted on the box body 52, which is capable of reducing a friction force during the transferring of the substrate 3000.

In other embodiments, only one of the import roller 2100 and the export roller 2200 may be arranged in the box body 52, and the other may be arranged in an apparatus corresponding to another station. For example, the import roller 2100 may be arranged in the box body 52, the export roller 2200 may be arranged in the cooling traction mechanism 1800 downstream of the third oven drying mechanism 500. Alternatively, the import roller 2100 may be arranged in the second traction mechanism 1300 upstream of the third oven drying mechanism 500, and the export roller 2200 may be arranged in the box body 52.

Figure 3:
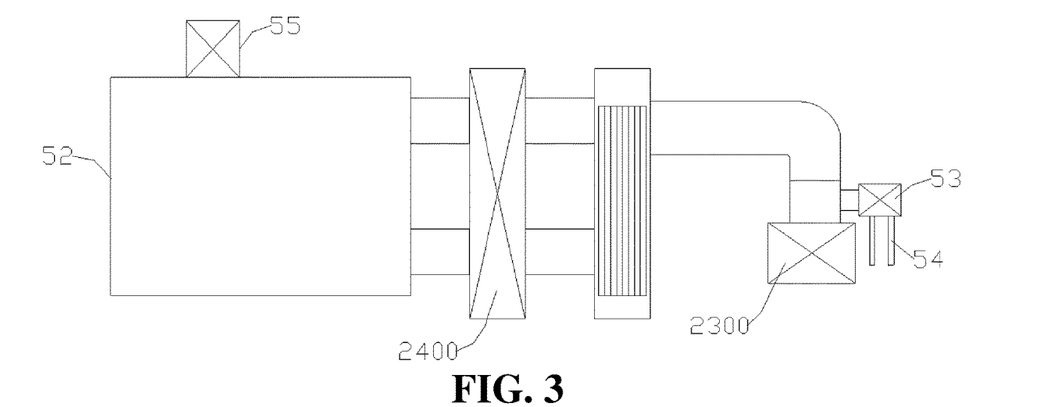
FIG. 3 is a schematic structural diagram of a third oven drying mechanism according to some embodiments of the present application from a second angle of view.

As shown in FIG. 3, in some embodiments, the coating device 1000 further includes a filtering assembly 2300, the filtering assembly 2300 is arranged in the air inlet portion 521, and the filtering assembly 2300 is configured to filter the fluid medium entering the box body 52 from the air inlet portion 521. The filtering assembly 2300 is capable of filtering the fluid medium entering the box body 52 from the air inlet portion 521 so that the fluid medium entering the box body 52 is clean enough, thereby improving the safety and oven drying quality of the oven drying process. The filtering assembly 2300 may be a structure such as a filter screen.

In some embodiments, the coating device 1000 further includes a preheating assembly 2400, the preheating assembly 2400 is arranged at the air inlet portion 521, and the preheating assembly 2400 is configured to preheat the fluid medium entering the box body 52 from the air inlet portion 521 to avoid an excessively low temperature of the fluid medium entering the box body 52 from the air inlet portion 521, thus reducing a temperature in the box body 52 and affecting the oven drying of the third oven drying mechanism 500 for the coating of the second surface of the substrate 3000.

In some embodiments, the third oven drying mechanism 500 further includes a fresh air outlet 54. The cycling unit 53 extracts fresh air from the outside through the fresh air outlet 54 and guides the fresh air from the air inlet portion 521 into the box body 52. The preheating assembly 2400 may only be configured to preheat the fresh air extracted from the fresh air outlet 54, and may also preheat a mixed medium of the fresh air entering from the fresh air outlet 54 and the fluid medium discharged from the return air portion 522. The preheating assembly 2400 is arranged downstream of the filtering assembly 2300, that is, the fresh air is filtered by the filtering assembly 2300 first, and then preheated by the preheating assembly 2400.

In some embodiments, the box body 52 is further provided with an air exhaust outlet 525 connected to an internal space of the box body 52. The third oven drying mechanism 500 further includes an air exhaust unit 55, and the air exhaust unit 55 is configured to discharge the fluid medium in the box body 52 from the air exhaust outlet 525. In the process of discharging the fluid medium in the box body 52 by the air exhaust unit 55, the fluid medium will discharge a solvent that carries the oven dried and evaporated coating of the substrate 3000, thereby reducing a weight loss rate.

Figure 4:
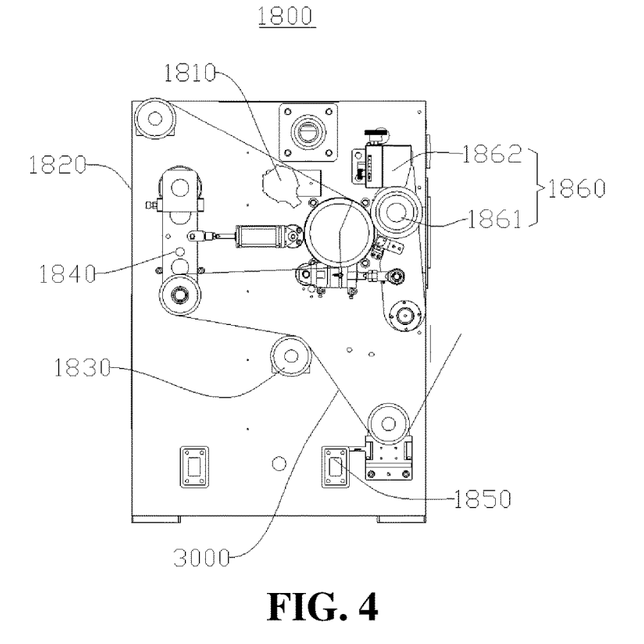
FIG. 4 is a schematic structural diagram of a cooling traction mechanism according to some embodiments of the present application.

As shown in FIG. 4, in some embodiments, the coating device 1000 further includes an air blowing portion 1810, the air blowing portion 1810 is arranged downstream of the third oven drying mechanism 500, and the air blowing portion 1810 is configured to provide the fluid medium to the substrate 3000 to adjust the temperature of the substrate 3000. The air blowing portion 1810 is mainly configured to reduce the temperature of the substrate 3000. For example, the air blowing portion 1810 provides cold air to the substrate 3000, which is capable of cooling the substrate 3000 after oven drying, so that the substrate 3000 is cooled rapidly, and the substrate 3000 is capable of performing the next process, thereby improving the production efficiency. In addition, performing cooling after the oven drying is further capable of reducing the risk of wrinkling in a transferring process of the substrate 3000, so that the transferring of the substrate 3000 is stable, and the stability of acceleration of the transferring speed of the substrate 3000 is ensured.

In some embodiments, the coating device 1000 further includes a cooling box 1820, the cooling box 1820 is arranged downstream of the third oven drying mechanism 500, and the air blowing portion 1810 is arranged in the cooling box 1820. The cooling box 1820 is provided with a plurality of traction rollers 1830, and the plurality of traction rollers 1830 are configured to wind the substrate 3000 in turn in a moving direction thereof. The air blowing portion 1810 is arranged in the cooling box 1820. The air blowing portion 1810 is capable of providing the fluid medium to the cooling box 1820 to adjust the temperature of the substrate 3000 in the cooling box 1820, and narrowing a diffusion range of the fluid medium, thus being capable of quickly adjusting the temperature of the substrate 3000. The cooling box 1820 is provided with a plurality of traction rollers 1830, and is capable of extending a moving path of the substrate 3000 in the box body 52, thereby extending the temperature adjustment time, and ensuring that the temperature of the substrate 3000 is adjusted to a required range.

In some embodiments, the coating device 1000 further includes a tension adjusting mechanism 1840, the tension adjusting mechanism 1840 is arranged in the cooling box 1820, and the tension adjusting mechanism 1840 is configured to adjust a tension of the substrate 3000, so that the tension of the substrate 3000 is balanced, thereby ensuring that the substrate 3000 is transferred smoothly.

In some embodiments, the air blowing portion 1810, the cooling box 1820, the tension adjusting mechanism 1840, and the plurality of traction rollers 1830 jointly form the cooling traction mechanism 1800 of the coating device 1000.

In some embodiments, the cooling traction mechanism 1800 further includes a tension sensor 1850, and the tension sensor 1850 is arranged in the cooling box 1820. The tension sensor 1850 is configured to detect the tension of the substrate 3000. The tension adjusting mechanism 1840 adjusts the tension of the substrate 3000 according to a tension signal of the substrate 3000 acquired by the tension sensor 1850, so that the tension of the substrate 3000 is balanced, which is capable of realizing stable transferring.

In some embodiments, the cooling traction mechanism 1800 further includes a tension partition mechanism 1860, and the tension partition mechanism 1860 is configured to press the substrate 3000 in cooperation with one traction roller 1830 of the plurality of traction rollers 1830, so that the substrate 3000 is capable of forming different tensions at the substrate 3000 located on both sides of the tension partition mechanism 1860 in the transferring direction of the substrate 3000, so as to meet requirements of smooth transferring. The tension partition mechanism 1860 includes a press roller 1861 and a press roller drive unit 1862. The press roller drive unit 1862 drives the press roller 1861 to move in the cooling box 1820, so as to adjust a distance between a peripheral surface of the press roller 1861 and a peripheral surface of the traction roller 1830 cooperating with the tension partition mechanism 1860, thereby adjusting the compression degree of the press roller 1861 and the traction roller 1830 on the substrate 3000, and adjusting a friction force between the substrate 3000 and the driving roller 51, so that the substrate 3000 is capable of forming different tensions for the substrate 3000 located on both sides of the tension partition mechanism 1860.

In some embodiments, the structures of the first oven drying mechanism 200 and the second oven drying mechanism 400 may be obtained with reference to the structure of the third oven drying mechanism 500. In some embodiments, the structures of the first oven drying mechanism 200 and the first oven drying mechanism 200 may be different from the structure of the third oven drying mechanism 500.

Figure 5:
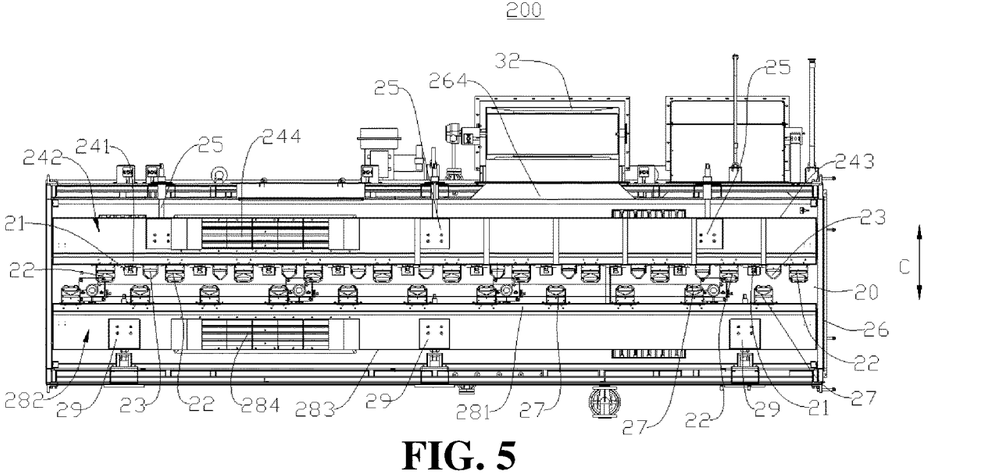
FIG. 5 is a sectional diagram of a second oven drying mechanism according to some embodiments of the present application.
Figure 6:
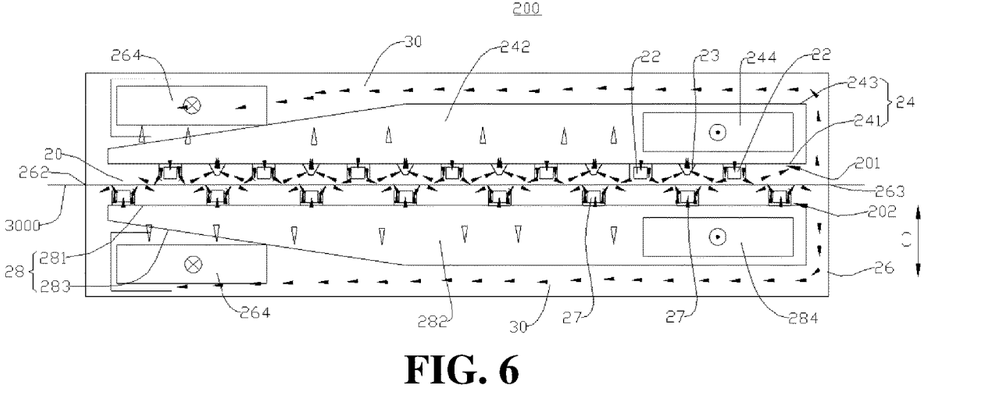
FIG. 6 is a schematic structural diagram of a first oven drying mechanism according to some embodiments of the present application.

For example, as shown in FIG. 5 and FIG. 6, in some embodiments, the first oven drying mechanism 200 includes an oven drying chamber 20 and an oven drying assembly 21. The oven drying chamber 20 is configured to accommodate a piece to be oven dried. The oven drying chamber 20 has a first oven drying side 201 facing the piece to be oven dried. The first oven drying side 201 is provided with a plurality of first air supplying portions 22 for a fluid medium to enter the oven drying chamber 20. The oven drying assembly 21 is arranged on the first oven drying side 201, and the oven drying assembly 21 is configured to oven dry the coating on the substrate 3000. The first oven drying side 201 is further provided with an air extraction portion 23, and at least one air extraction portion 23 is arranged between two adjacent first air supplying portions 22. The air extraction portion 23 is configured for the fluid medium in the oven drying chamber 20 to be discharged from the oven drying chamber 20.

The oven drying assembly 21 may be a heating resistance wire, an infrared lamp tube, and the like.

The air extraction portion 23 is capable of discharging the fluid medium in the oven drying chamber 20 out of the oven drying chamber 20. When the fluid medium is supplied from the two adjacent first air supplying portions 22 to the oven drying chamber 20, the fluid medium acts on the piece to be oven dried, and is guided to a position between the two first air supplying portions 22 by the piece to be oven dried, so that the heat carried by the fluid medium converges between the two first air supplying portions 22, causing a corresponding part between the two adjacent first air supplying portions 22 to be overheated. Therefore, heating of the piece to be oven dried is uneven at various positions. The air extraction portion 23 is arranged between the two first air supplying portions 22, which is capable of discharging the fluid medium between the two first air supplying portions 22 and taking away the heat, so as to prevent the heat from converging between the two first air supplying portions 22 and improve the heating uniformity of the piece to be oven dried.

The first air supplying portion 22 may be an air nozzle, an air supplying port, and the like, and the air extraction portion 23 may be an air nozzle, an air extraction port, and the like.

In some embodiments, the first oven drying mechanism 200 includes a first wall 241 facing the substrate 3000 in a third direction C. The first air supplying portion 22, the oven drying assembly 21, and the air extraction portion 23 are all arranged on the first wall 241, and the first air supplying portion 22, the oven drying assembly 21, and the air extraction portion 23 are all arranged on one side of the first wall 241 facing the oven drying chamber 20. The first oven drying mechanism 200 further includes a first drive unit 25, and the first drive unit 25 is configured to adjust a distance between the first wall 241 and the piece to be oven dried in the third direction C. The first drive unit 25 is capable of driving the first wall 241 arranged with the first air supplying portion 22, the oven drying assembly 21, and the air extraction portion 23 to move, so as to adjust the distance between the first wall 241 and the substrate 3000 in the third direction C, thereby adjusting the distance between the oven drying assembly 21 and the substrate 3000 to meet different heating requirements and improve the heating quality.

In some embodiments, the first oven drying mechanism 200 further includes a first air inlet chamber 242, and the first air inlet chamber 242 is separated from the oven drying chamber 20 by the first wall 241. The first air inlet portion 521, the oven drying assembly 21, and the air extraction portion 23 are all arranged on the first wall 241. The first air supplying portion 22 is configured for the fluid medium in the first air inlet chamber 242 to enter the oven drying chamber 20. The fluid medium enters the first air inlet chamber 242 and then enters the oven drying chamber 20 from a plurality of first air supplying portions 22, so that the fluid medium is capable of being evenly distributed in the oven drying chamber 20, thus improving the heating uniformity of the substrate 3000. The first air inlet chamber 242 and the oven drying chamber 20 share the first wall 241 and are separated by the first wall 241, which is capable of reducing the volume of the first oven drying mechanism 200.

The first oven drying mechanism 200 further includes an outer box 26. The oven drying chamber 20 and the first air inlet chamber 242 are both arranged in the outer box 26.

In some embodiments, the first oven drying mechanism 200 includes a first wind box 24, and the first air inlet chamber 242 is formed inside the first wind box 24. The first wind box 24 includes the first wall 241 and a first box wall 243 having a first opening, and the first wall 241 covers the first opening so that the first wall 241 and the first box wall 243 jointly define the first air inlet chamber 242. The first air inlet chamber 242 is in communication with the outer box 26 through the first air supplying portion 22. The first drive unit 25 is mounted in the outer box 26. The first drive unit 25 drives the first wind box 24 to move in the third direction C in the outer box 26, so that the first wall 241 moves in the third direction C.

The first wind box 24 is further provided with a first air supplying port 244, and the first air supplying port 244 is in communication with the first air inlet chamber 242. The fluid medium is supplied to the first air inlet chamber 242 through the first air supplying port 244, and the fluid medium entering the first air inlet chamber 242 then enters the oven drying chamber 20 through the first air supplying portion 22.

In some embodiments, the oven drying chamber 20 is further provided with a second oven drying side 202 arranged opposite to the first oven drying side 201 in the third direction C, and the second oven drying side 202 is provided with a plurality of second air supplying portions 27 for the fluid medium to enter the oven drying chamber 20. The first air supplying portion 22 is capable of enabling the fluid medium to enter the oven drying chamber 20 from the second oven drying side 202 of the oven drying chamber 20, and is capable of speeding up the flow of the fluid medium in the oven drying chamber 20, thereby speeding up the flow of heat in the oven drying chamber 20, so that the heat is evenly distributed in the oven drying chamber 20, and the heating uniformity of the substrate 3000 is improved.

The second oven drying side 202 is located on one side of the substrate 3000 away from the first oven drying side 201. The second air supplying portion 27 may be an air nozzle, an air supplying port, and the like. When the second air supplying portion 27 is the air nozzle, the second air supplying portion 27 may be extended into the oven drying chamber 20 to reduce the distance from the substrate 3000.

In some embodiments, the first oven drying mechanism 200 includes the first wall 241 facing the piece to be oven dried in the third direction C and a second wall 281 arranged opposite to the first wall 241. The first air supplying portion 22, the oven drying assembly 21, and the air extraction portion 23 are all arranged on the first wall 241, and the second air supplying portion 27 is arranged on the second wall 281. The oven drying chamber 20 is located between the first wall 241 and the second wall 281 in the third direction C. The first oven drying mechanism 200 further includes a second drive unit 29, and the second drive unit 29 is configured to drive the second wall 281 to move to adjust the distance between the second wall 281 and the first wall 241 in the third direction C. The second drive unit 29 is capable of driving the second wall 281 to move to adjust the distance between the second wall 281 and the first wall 241 in the third direction C to adapt to the substrate 3000 with different sizes in the third direction C. The third direction C is consistent with the thickness direction of the substrate 3000, and the first surface and the second surface are two opposite surfaces of the substrate 3000 in the third direction C, respectively.

The second drive unit 29 may be a linear driving mechanism such as an adjusting screw, a linear motor, and an air cylinder. The second drive unit 29 drives the second wall 281 to move back and forth in the third direction C so that the second wall 281 is moved to be close to or away from the substrate 3000 or the first wall 241, so as to adjust the distance between the second air supplying portion 27 and the substrate 3000 or the distance between the second wall 281 and the first wall 241. A plurality of second drive units 29 may be arranged at intervals to be capable of adjusting the second wall 281 in the third direction C from a plurality of positions. Especially, when the length direction and/or width direction of the second wall 281 are large in size, driving the second wall 281 to move in the third direction C by the plurality of second drive units 29 is capable of enabling various positions of the second wall 281 in the length direction and/or width direction to be the same as the distance from the substrate 3000 in the third direction C, thereby reducing a distance difference between the various positions of the substrate 3000 and the second air supplying portion 27 in the third direction C, improving the heating uniformity, and improving the product quality.

In some embodiments, the first oven drying mechanism 200 includes a second wind box 28, the second wind box 28 forms a second air inlet chamber 282 inside, the second wind box 28 includes a second wall 281 and a second box wall 283 having a second opening, and the second wall 281 covers the second opening so that the second wall 281 and the second box wall 283 jointly define the second air inlet chamber 282. The second air inlet chamber 282 is in communication with the inner space of the outer box 26 through the second air supplying portion 27. The second drive unit 29 is mounted in the outer box 26. The second drive unit 29 drives the second wind box 28 to move in the third direction C in the outer box 26, so that the second wall 281 moves in the third direction C.

The second wind box 28 is further provided with a second air supplying port 284, and the second air supplying port 284 is in communication with the second air inlet chamber 282. The fluid medium is provided to the second air inlet chamber 282 through the second air supplying port 284, and the fluid medium entering the second air inlet chamber 282 enters the oven drying chamber 20 through the second air supplying portion 27.

The outer box 26 is further provided with a first penetrating inlet 262 for the substrate 3000 to penetrate into the outer box 26 and a first penetrating outlet 263 for the substrate 3000 to penetrate out of the outer box 26. The first penetrating inlet 262 and the first penetrating outlet 263 are both in communication with the outer box 26. In the processes of the substrate 3000 penetrating into the outer box 26 from the first penetrating inlet 262 and penetrating out of the outer box 26 from the first penetrating outlet 263, the first oven drying mechanism 200 oven dries the coating on the substrate 3000.

In some embodiments, the first oven drying mechanism 200 further includes a return air chamber 30 and a cycling unit 53 (not shown in the figure). The return air chamber 30 is configured to accommodate the fluid medium discharged from the air extraction portion 23, and the cycling unit 53 is configured to guide the fluid medium in the return air chamber 30 into the first air inlet chamber 242.

The fluid medium discharged from the air extraction portion 23 is capable of being accommodated in the return air chamber 30, and then enters the first air inlet chamber 242 under the action of the cycling unit 53, so that it is capable of entering the oven drying chamber 20 through the first air supplying portion 22, and is capable of recycling the heat generated by the oven drying assembly 21 in the oven drying chamber 20, thereby reducing energy consumption. The direction of a solid arrow in FIG. 5 is a flow path that the fluid medium entering the oven drying chamber 20 from the first air supplying portion 22 acts on the substrate 3000, the air extraction portion 23, and finally passes through the return air chamber 30 and is discharged from the first air exhaust outlet 264 on the outer box 26. The direction of a hollow arrow is a path of directly discharging the fluid medium in the outer box 26 through the first air exhaust outlet 264.

In some embodiments, the outer box 26 is further provided with the first air exhaust outlet 264 in communication with the internal of the outer box 26. The first oven drying mechanism 200 further includes a first air exhaust unit 32, and the first air exhaust unit 32 is configured to discharge the fluid medium in the outer box 26 from the first air exhaust outlet 264. In the process of the first air exhaust unit 32 discharging the fluid medium in the outer box 26, the fluid medium will discharge the solvent that carries the oven dried and evaporated coating of the substrate 3000 to reduce the weight loss rate.

In some embodiments, the return air chamber 30 is jointly defined by an outer wall of the first box wall 243, an outer wall of the second box wall 283, and an inner wall of the outer box 26. The return air chamber 30 is in communication with the oven drying chamber 20. The fluid medium in the oven drying chamber 20 is capable of entering the return air chamber 30 directly, or entering the return air chamber 30 through the air extraction portion 23. The fluid medium entering the return air chamber 30 enters the first air inlet chamber 242 and/or the second air inlet chamber 282 under the drive of the cycling unit 53. In some embodiments, the cycling unit 53 may enable the fluid medium in the return air chamber 30 to be discharged through the first air exhaust outlet 264 and then guided into the oven drying chamber 20 through the first air supplying portion 22.

The above are only some examples of the present application, and are not intended to limit the present application. For those skilled in the art, the present application may have various modifications and changes. Any modifications, equivalent replacements, improvements, and the like made within the spirit and principle of the present application shall be included within the protection scope of the present application.

What is claimed is:

1. A coating device, comprising:
a first coating mechanism configured to form a first coating on a first surface of a substrate;
a first oven drying mechanism arranged downstream of the first coating mechanism, the first oven drying mechanism being configured to oven dry the first coating on the first surface;
a second coating mechanism arranged downstream of the first oven drying mechanism, the second coating mechanism being configured to form a second coating on a second surface of the substrate opposite to the first surface;
a second oven drying mechanism arranged downstream of the second coating mechanism, the second oven drying mechanism being configured to oven dry the second coating on the second surface;
a third oven drying mechanism arranged downstream of the second oven drying mechanism, the third oven drying mechanism being configured to oven dry the second coating on the second surface a third oven drying mechanism arranged downstream of the second oven drying mechanism, the third oven drying mechanism being configured to oven dry the second coating on the second surface, and the third oven drying mechanism comprising:
a box body;
a plurality of driving rollers arranged in the box body and configured to transfer the substrate; and
a heating assembly arranged in the box body;
an import roller arranged on an outer wall of the box body and configured to import the substrate into the box body;
an export roller arranged on the outer wall of the box body and configured to export the substrate out of the box body, a position of the import roller being higher than a position of the export roller; and
at least one density measuring mechanism arranged downstream of the first coating mechanism, and configured to monitor in real-time at least one of a surface density of the first coating or a surface density of the second coating, and communicate with at least one of the first coating mechanism or the second coating mechanism to perform closed-loop control of coating weight on at least one of the first surface or the second surface;
wherein a heating power of the third oven drying mechanism is less than a heating power of the first oven drying mechanism, and is less than a heating power of the second oven drying mechanism.

2. The coating device according to claim 1, wherein the substrate forms transferring sections each between two adjacent ones of the plurality of driving rollers; and
the heating assembly is arranged between two of the transferring sections that are adjacent and opposite to each other, and facing the second surface.

3. The coating device according to claim 2, wherein:
the box body is provided with an inlet portion for a fluid medium to enter the box body and a return portion for the fluid medium in the box body to be discharged; and
the third oven drying mechanism further comprises a cycling unit, the cycling unit being configured to guide the fluid medium discharged from the return portion into the box body through the inlet portion.

4. The coating device according to claim 3, wherein;
the box body is further provided with an inlet for the substrate to enter the box body and an outlet for the substrate to exit the box body;
the import roller is arranged at the inlet, the import roller being and configured to import the substrate into the box body through the inlet; and
the export roller is arranged at the outlet, the export roller being and configured to export the substrate out of the box body through the outlet.

5. The coating device according to claim 3, further comprising:
a filter assembly, the filter assembly being arranged at the inlet portion, and the filter assembly being configured to filter the fluid medium entering the box body through the air inlet portion.

6. The coating device according to claim 3, further comprising:
a preheating assembly, the preheating assembly being arranged at the inlet portion, and the preheating assembly being configured to preheat the fluid medium entering the box body through the inlet portion.

7. The coating device according to claim 1, further comprising:
a blowing portion, the blowing portion being arranged downstream of the third oven drying mechanism, and the blowing portion being configured to provide the fluid medium to the substrate to adjust a temperature of the substrate.

8. The coating device according to claim 7, further comprising:
a cooling box, the cooling box being arranged downstream of the third oven drying mechanism, and the air blowing portion being arranged in the cooling box; and
a plurality of traction rollers arranged in the cooling box, the plurality of traction rollers being configured to allow the substrate to be wound sequentially in a moving direction of the substrate.

9. The coating device according to claim 8, further comprising a tension adjusting mechanism, the tension adjusting mechanism being arranged in the cooling box, and the tension adjusting mechanism being configured to adjust a tension of the substrate.

10. The coating device according to claim 1, further comprising:
a head correction mechanism arranged upstream of the second coating mechanism, the head correction mechanism being configured to adjust a position of the substrate before the second coating mechanism forms the second coating on the second surface of the substrate.

11. The coating device according to claim 1, further comprising:
a head correction mechanism arranged upstream of the second coating mechanism, the head correction mechanism being configured to work with a charge-coupled device measurement system to perform closed-loop control of position adjustment of the substrate before the second coating mechanism forms the second coating on the second surface of the substrate.

12. The coating device according to claim 1,
wherein the second coating mechanism is located at a lower row, and the second oven drying mechanism is located at an upper row higher than the lower row;
the coating device further comprising:
a climbing mechanism arranged downstream of the second coating mechanism and upstream of the second oven drying mechanism, the climbing mechanism being configured to draw the substrate from the second coating mechanism to the second oven drying mechanism.

13. The coating device according to claim 1, wherein:
the import roller is rotationally mounted on the box body; and
the export roller is rotationally mounted on the box body.

* * * * *